(No Model.)
I. H. BRADSHAW.
Vehicle Wheel.
No. 241,284.    Patented May 10, 1881.
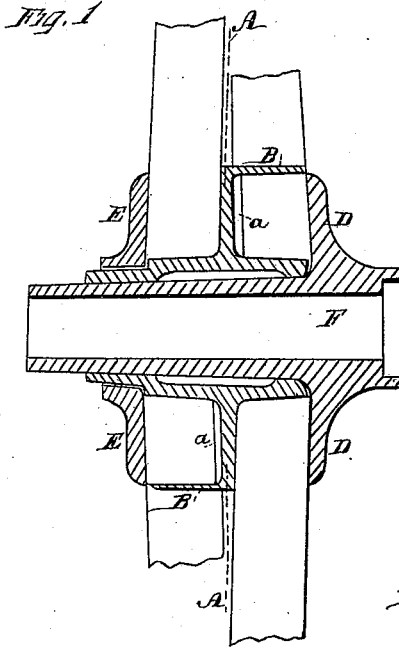
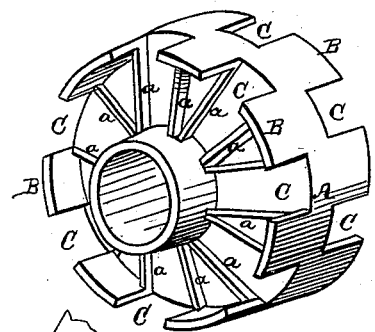
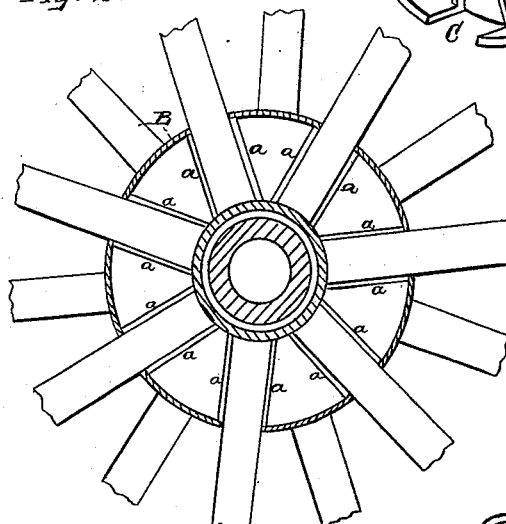
Witnesses,
Geo. H. Strong.
Frank A. Brooks
Inventor,
Ira H. Bradshaw
By Dewey & Co.
Attys

UNITED STATES PATENT OFFICE.

IRA H. BRADSHAW, OF SAN LEANDRO, CALIFORNIA.

VEHICLE-WHEEL.

SPECIFICATION forming part of Letters Patent No. 241,284, dated May 10, 1881.

Application filed February 9, 1881. (No model.)

*To all whom it may concern:*

Be it known that I, IRA H. BRADSHAW, of San Leandro, county of Alameda, State of California, have invented an Improved Vehicle-Wheel; and I hereby declare the following to be a full, clear, and exact description thereof.

My invention relates to certain improvements in vehicle-wheels; and it is particularly adapted to the construction of wheels which are used upon mowing and reaping machines, headers, and heavy agricultural machinery.

It consists in a novel construction of a wheel having a hub in which the spoke-sockets are formed alternately upon each side of a central disk or flange, whereby the basis of the alternate spokes are entirely separated from each other, while their outer ends connect with the rim in line with each other. This leaves sufficient space so that the spokes may be all made of a certain size and need not be tapered to fit the sockets. The sockets have flanges projecting from one side to grasp the edge of the spoke and hold it. In combination with these sockets, I employ two exterior disks, one of which is formed on the box in which the axle turns. This box extends through a central hole in the spoke-socket portion of the hub, and the opposite flange slips over its end, being either screwed on or bolted through to the opposite disk, so that the two are drawn closely against the sides of the spoke-sockets, which they close on the outer sides.

Referring to the accompanying drawings for a more complete explanation of my invention, Figure 1 is a vertical section of my wheel, taken in a plane through the axis. Fig. 2 is a section through the spoke-sockets, in a plane transverse to the axis. Fig. 3 is a view of the spoke-holding sections.

A is a central flange projecting from the cylindrical hub, and having a rim, B, projecting upon each side, and having openings C formed in these rims to admit the spokes. These openings alternate upon each side of the flange, so that the spokes upon one side fall between those upon the other side. Lugs or projections *a* are formed upon the flange A, upon each side of the openings C, and extending toward the center, each pair being parallel, so that when the spoke is introduced its edge lies between these projections and is firmly held in place. As only one-half the whole number of spokes are fitted upon each side of the flange, there will be no necessity for tapering them or fitting them; but they may be made as simple straight square bars, and sawed off to the proper length, and driven into sockets without further labor, and this construction thus enables me to provide a cheap and strong wheel.

In order to close in the sides of the spoke-sockets, two flanges, D E, are employed having a diameter just sufficient to bring them up to the rim of the spoke-sockets. The flange D is formed or cast with the elongated box F, which extends through a central hole in the hub, and receives the axle G, upon which the wheel turns. The opposite end of this box is fitted to receive the flange E, and it may have screw-threads, so that the flange can be screwed up tightly, thus drawing both flanges up against the sides of the spoke-sockets; or the flange E may be slipped upon the end of the box and bolts H pass through the rims of both flanges, so that by the use of nuts they may be drawn together.

The whole construction is simple, light, and cheap, as the hollow shell forming the spoke-sockets and the box and flanges are easily cast, and the spokes themselves may be completed in the form of long bars or timbers by machinery, and then sawed to the proper length and put into their places without further fitting.

Having thus described my invention, what I claim as new, and desire to secure by Letters Patent, is—

The spoke socket or shell consisting of the flange A, rim B, with alternately-placed openings C upon opposite sides of the flange, in combination with the box F, fitting within the spoke-socket shell, and carrying the flange D, and having the opposing flange E fitting upon the shell, and drawn or forced against the sides of the shell so as to close it and form a hub, substantially as herein described.

In witness whereof I have hereunto set my hand.

IRA H. BRADSHAW.

Witnesses:
FRANK A. BROOKS,
S. H. NOURSE.